(12) United States Patent  
Narbaiza Gomez

(10) Patent No.: US 7,690,665 B2  
(45) Date of Patent: Apr. 6, 2010

(54) REAR BICYCLE FRAME STRUCTURE

(75) Inventor: Xabier Narbaiza Gomez, Mallabia (ES)

(73) Assignee: Orbea, S. Coop. Ltda., Mallabia (Bizkaia) (ES)

( * ) Notice: Subject to any disclaimer, the term of this patent is extended or adjusted under 35 U.S.C. 154(b) by 0 days.

(21) Appl. No.: 12/091,264

(22) PCT Filed: May 18, 2006

(86) PCT No.: PCT/ES2006/000259

§ 371 (c)(1),
(2), (4) Date: Apr. 23, 2008

(87) PCT Pub. No.: WO2007/048860

PCT Pub. Date: May 3, 2007

(65) Prior Publication Data

US 2008/0284128 A1   Nov. 20, 2008

(30) Foreign Application Priority Data

Oct. 25, 2005   (ES) .................. 200502595

(51) Int. Cl.
*B62K 3/02* (2006.01)
(52) U.S. Cl. .................................. 280/281.1; 280/274
(58) Field of Classification Search ............. 280/281.1, 280/274; D12/111
See application file for complete search history.

(56) References Cited

U.S. PATENT DOCUMENTS

| 588,274 | A | * | 8/1897 | Harris ................... 280/261 |
| 2,550,941 | A | * | 5/1951 | Schuricht ................ 280/288 |
| 3,226,132 | A | * | 12/1965 | Yuko ................... 280/281.1 |
| D216,538 | S | * | 2/1970 | Hill ....................... D12/11 |
| 3,534,980 | A | * | 10/1970 | Jacoby ................ 280/281.1 |
| 4,427,209 | A |   | 1/1984 | Morita |
| 4,813,696 | A | * | 3/1989 | Moulton .............. 280/281.1 |
| 4,995,627 | A | * | 2/1991 | Yun ...................... 280/261 |
| 5,018,758 | A | * | 5/1991 | Klein .................. 280/281.1 |
| 5,064,212 | A | * | 11/1991 | Yun ...................... 280/261 |
| 5,269,551 | A | * | 12/1993 | Martin et al. ........ 280/281.1 |
| 6,712,371 | B2 | * | 3/2004 | Trubiano ................ 280/274 |

FOREIGN PATENT DOCUMENTS

FR   2745782   9/1997

* cited by examiner

*Primary Examiner*—Tony H. Winner
(74) *Attorney, Agent, or Firm*—Lucas & Mercanti, LLP

(57) ABSTRACT

A rear bicycle frame structure which has different rear triangles that make up a common tubular structure that forms part of the front frame, an upper tie bolt and a lower tie bolt. The upper tie bolt and the lower tie bolt are joined by a fourth side forming four-sided piece. A rear axle is placed on the fourth side of each four-sided piece formed.

1 Claim, 1 Drawing Sheet

REAR BICYCLE FRAME STRUCTURE

BACKGROUND OF THE INVENTION

Throughout the history of the bicycle, one of the objectives of any manufacturer of high performance models has been to optimise the rigidity/weight ratio; in other words, to obtain maximum rigidity with minimal weight.

Minimising the weight corresponds to the need to reduce the mass that the cyclist has to ascend in positive slopes and facilitate accelerations to a maximum, as the smaller the mass the greater the acceleration under the same applied force (F=m*a).

However, in the search for minimal weight, the frame rigidity, a fundamental property when guaranteeing the control and stability of the vehicle, but also to make use of the cyclist's energy, has frequently been neglected. In other words, a frame, which, due to insufficient rigidity, loses its shape because of the forces applied by the cyclist's pedaling, means that no advantage is taken of the total applied energy. This energy loss is proportional to the square of the structure distortion (Energy ½*Structure Rigidity*Distortion$^2$).

SUMMARY OF THE INVENTION

It is thus clear that to optimise the performance of a bicycle it is not only necessary to reduce the weight, but also to maintain high rigidity levels.

After numerous theoretic calculations and different studies, the applicant has verified that:

1.—The lack of rigidity of the frames is expressed to a greater extent when standing up to pedal (climbs, sprints, ...), as the bicycle tends to sway from left to right. The existence of lateral forces in these cases causes the greatest distortions in use.

2.—These distortions can be reduced by improving lateral and torsional rigidity (respect to the longitudinal axis of the frame) of the bicycle.

3.—In turn, by improving these rigidities, greater riding precision as well as greater stability is achieved.

4.—The critical points of the structure are centered on the diagonal tube and the rear triangle.

The relevance of the comfort aspect is worth pointing out, on the other hand. This is understood as the absorption of vibrations transmitted from the ground to the cyclist, mainly vertically. This aspect has also been studied and optimised when configuring the rear structure of the bicycle frame targeted by the invention.

One characteristic that is becoming more and more important in this field, is the absorption of ground unevenness and different vibrations, generally in vertical direction. The normal solution for this problem involves adopting complicated rear suspension systems, comprised of mechanisms and dampers with multiple configurations.

In the solution proposed to construct the rear part of the bicycle frame according to the subject of the invention, apart from providing high rigidity, it provides greater absorption than that of a classic triangle, thanks to the inclusion of a supplementary vertex in the rear structure, which also provides slight vertical bending that increases the comfort of the user when riding.

After having carried out the optimisation work on the diagonal tube, the rigidising work is concentrated on the rear of the bicycle frames. It is this aspect that the patent application is based upon.

Historically, the rear part of bicycle frames has been solved by a double rear triangle comprised of three classic vertices: bottom bracket, rear axle and upper tube-saddle tube joint. Obviously the rear wheel will be included between both triangular structures.

The basis of this new application is the breakage of this triangle via the insertion of a new vertex. Thus, a four-sided piece is formed, whose structural performance is greater than the classic triangular shapes.

This improved performance is determined by the increase in separation between bases and tie bolts, which provides a proportional increase in rigidity of the rear part given the greater momentum of inertia of the four-sided piece with respect to the triangle.

With the same weight, the four-sided piece has a greater momentum of inertia with respect to the "z" and "y" axes, so it will undergo less distortion caused by lateral forces (x-direction) and torsional forces (y-direction) respectively. This will be translated into a better use of the cyclist's energy.

The rear structure of the bicycle frame targeted by the invention, being of the kind that is made up of several rear triangles comprised of a common tubular structure that forms part of the front frame, an upper tie bolt and a lower tie bolt, is characterised because the upper tie bolt and the lower tie bolt are joined together by a fourth side, forming a four-sided piece.

Any practical executions that do not alter, change or modify the essentiality proposed are included within the subject of the invention, and above all:

a) That the fourth side is basically straight or is basically curved;

b) that the vertices are defined by the following coordinates:

| | |
|---|---|
| V1 | x: 420 ± 76/y: 126 ± 22 |
| V2 | x: 410 ± 20/y: 70 ± 15 |
| V3 | x: 340 ± 20/y: 22 ± 10 |
| V4 | x: 0/y: 0 | or that they are defined by coordinates that exceed or do not reach the margin of variation of the tolerances mentioned.

In order to understand the subject of this invention better, a preferential form of practical execution is illustrated on the drawings, subject to incidental changes that take nothing away from its foundation.

DETAILED DESCRIPTION OF THE DRAWINGS

Figure 1:
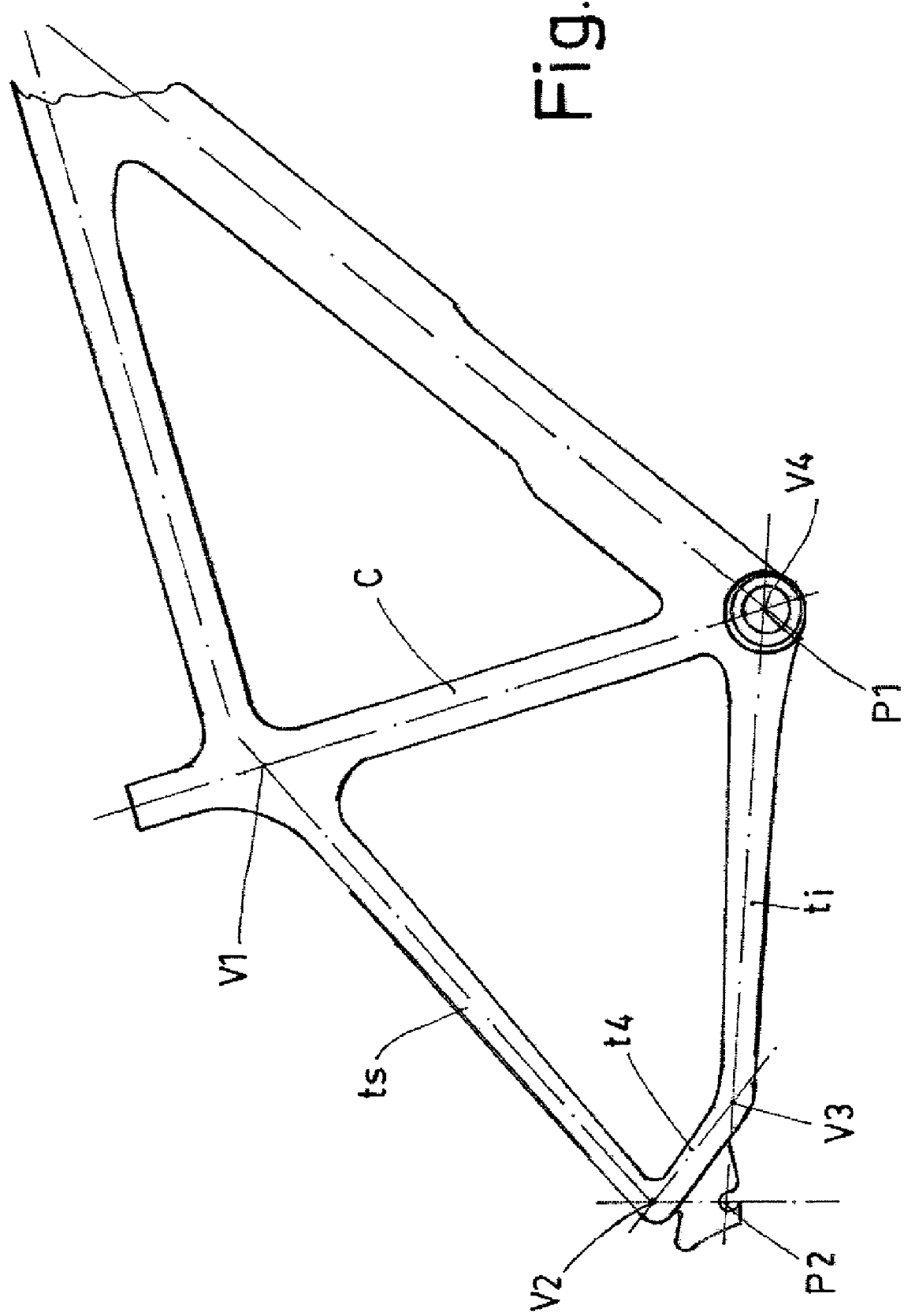
FIG. 1 shows a general schematic elevation view of a bicycle frame that includes the rear structure according to the invention.

An example of a non-limiting practical execution of this invention is described below.

A conventional bicycle frame is comprised of a front frame and different rear triangles that extend from a common tubular structure (C) where they are placed coaxially according to the longitudinal axis to the bottom bracket and the upper tube/saddle tube joint.

According to the invention, the joint between the upper tie bolt (ts) and the lower tie bolt (ti), which coming from the common tubular (C) form part of the rear triangle, is carried out by means of a fourth tie bolt (t4) forming a four-sided piece.

This four-sided piece is comprised of the aforementioned common tubular structure (C) and the aforementioned tie bolts (ts), (ti), (t4) and perfectly defined by the coordinates of their vertices (V1), (V2), (V3), (V4).

It does not matter and it is accessory to the purposes of the invention if the aforementioned tie bolt (t4), or any of the tie bolts (ts), (ti) and/or the common tubular structure (C) are basically straight or basically curved.

If a Cartesian system of coordinates is situated on the bottom bracket, the position of each vertex (V1), (V2), (V3), (V4) is the following:

| | |
|---|---|
| V1 | x: 420 ± 76/y: 126 ± 22 |
| V2 | x: 410 ± 20/y: 70 ± 15 |
| V3 | x: 340 ± 20/y: 22 ± 10 |
| V4 | x: 0/y: 0 |

The rear axis (P2) bearing the rear wheel of the bicycle is placed on the fourth side (t4) of the four-sided piece formed—see FIG. 1.

The invention claimed is:

1. A rear bicycle frame structure, comprising:
different rear triangles making up a common tubular structure that forms part of a front frame, an upper tie bolt and a lower tie bolt,
wherein the upper tie bolt and the lower tie bolt are joined by means of a connecting piece forming a four-sided piece, whose vertices are defined by the following coordinates in a Cartesian system:

| | |
|---|---|
| V1 | x:126 ± 22/y:420 ± 76 |
| V2 | x:410 ± 20/y:70 ± 15 |
| V3 | x:340 ± 20/y:22 ± 10 |
| V4 | X:0/y:0 | so that the structure can bend towards the connecting piece facilitating vertical bending that increases a cyclist's comfort when riding.

\* \* \* \* \*